(12) United States Patent
Pawar et al.

(10) Patent No.: US 10,405,281 B1
(45) Date of Patent: Sep. 3, 2019

(54) DYNAMIC MINIMUM RECEIVER LEVELS BASED ON CARRIER AGGREGATION

(71) Applicant: Sprint Communications Company L.P., Overland Park, KS (US)

(72) Inventors: Hemanth Balaji Pawar, Brambleton, VA (US); Krishna Datt Sitaram, Chantilly, VA (US); Shilpa Srinivas Kowdley, Herndon, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/624,448

(22) Filed: Jun. 15, 2017

(51) Int. Cl.
*H04W 28/02* (2009.01)
*H04W 48/14* (2009.01)
*H04W 52/28* (2009.01)
*H04W 88/10* (2009.01)

(52) U.S. Cl.
CPC ............ *H04W 52/28* (2013.01); *H04W 88/10* (2013.01)

(58) Field of Classification Search
CPC . H04J 11/0069; H04W 48/16; H04W 52/146; H04W 52/242; H04W 52/245; H04W 52/246; H04W 52/322
USPC ..... 455/69, 522, 436, 422.1, 562.1, 135, 73, 455/140, 452.1, 435.2, 176.1; 370/336, 370/252, 332, 331
See application file for complete search history.

(56) References Cited

U.S. PATENT DOCUMENTS

| | | | | |
|---|---|---|---|---|
| 6,967,935 B1 * | 11/2005 | Park | ..................... | H04B 7/2656 370/320 |
| 8,818,290 B1 * | 8/2014 | Narendran | ........... | H04B 7/0871 370/329 |
| 9,544,829 B1 * | 1/2017 | Singh | ................ | H04W 36/0083 |
| 9,930,586 B2 * | 3/2018 | Xiao | ................ | H04W 36/0088 |
| 2010/0222059 A1 * | 9/2010 | Pani | ...................... | H04W 36/28 455/436 |
| 2012/0002643 A1 * | 1/2012 | Chung | ................. | H04J 11/0093 370/331 |
| 2012/0142354 A1 * | 6/2012 | Ahluwalia | ........ | H04W 36/0072 455/436 |
| 2012/0236717 A1 * | 9/2012 | Saska | .................... | H04W 48/02 370/235 |
| 2012/0300754 A1 * | 11/2012 | Rosenqvist | ............ | H04B 7/024 370/336 |
| 2014/0051426 A1 * | 2/2014 | Siomina | ............ | H04W 36/0088 455/422.1 |
| 2014/0204777 A1 * | 7/2014 | Huang | .................. | H04W 36/28 370/252 |

(Continued)

*Primary Examiner* — Tan H Trinh (57) ABSTRACT

Methods and systems are disclosed for a dynamic minimum receiver level. A base station can transmit a set of access parameters that enable the mobile device to communicate with the base station. The set of access parameters may comprise a first minimum receiver (RX) level that corresponds to a first standard of qualified communications between the mobile device and the base station utilizing carrier aggregation, and a second minimum RX level that corresponds to a second standard of qualified communications between the mobile device and the base station without utilizing carrier aggregation. The mobile device may be configured to receive the set of access parameters and selectively employ the first minimum RX level so as to communicate with the base station within the qualified coverage area according to the first standard of qualified communications.

19 Claims, 7 Drawing Sheets

(56) References Cited

U.S. PATENT DOCUMENTS

| | | | |
|---|---|---|---|
| 2014/0328327 A1* | 11/2014 | Xiao | H04W 36/30 370/332 |
| 2015/0009813 A1* | 1/2015 | Nguyen | H04W 74/002 370/230 |
| 2015/0146687 A1* | 5/2015 | Kim | H04W 76/14 370/331 |
| 2015/0341855 A1* | 11/2015 | Bergman | H04W 48/18 370/329 |
| 2016/0142981 A1* | 5/2016 | Yi | H04J 11/0069 455/522 |
| 2017/0078933 A1* | 3/2017 | Li | H04W 36/0077 |
| 2017/0141833 A1* | 5/2017 | Kim | H04B 7/0626 |
| 2017/0181145 A1* | 6/2017 | Fong | H04W 72/042 |
| 2017/0207889 A1* | 7/2017 | Mizusawa | H04W 72/0446 |
| 2017/0280436 A1* | 9/2017 | Park | H04L 1/00 |
| 2017/0289974 A1* | 10/2017 | Lee | H04W 72/042 |
| 2017/0339608 A1* | 11/2017 | Cui | H04B 17/318 |
| 2017/0359759 A1* | 12/2017 | Brown | H04W 48/12 |
| 2018/0049267 A1* | 2/2018 | Chen | H04W 76/10 |
| 2018/0077722 A1* | 3/2018 | Awad | H04W 74/004 |
| 2018/0092062 A1* | 3/2018 | Chen | H04W 4/70 |
| 2018/0103405 A1* | 4/2018 | Kim | H04W 76/36 |
| 2018/0152966 A1* | 5/2018 | Goldhamer | H04W 74/0808 |
| 2018/0199369 A1* | 7/2018 | Larsson | H04W 74/006 |

* cited by examiner

DYNAMIC MINIMUM RECEIVER LEVELS BASED ON CARRIER AGGREGATION

SUMMARY

A high level overview of various aspects of the invention is provided here for that reason, to provide an overview of the disclosure and to introduce a selection of concepts that are further described below in the Detailed Description section. This summary is not intended to identify key features or essential features of the claimed subject matter, nor is it intended to be used as an aid in isolation to determine the scope of the claimed subject matter.

In brief, and at a high level, this disclosure describes, among other things, methods and systems for utilizing dynamic minimum receiver (RX) levels based on the availability of carrier aggregation at a base station. For example, instead of utilizing default minimum RX levels for all mobile devices, embodiments provide for a base station that facilitates a dynamic selection of a minimum RX level based on a mobile device's ability to utilize carrier aggregation for communication with the base station. In one embodiment, a base station transmits both a first minimum RX level and a second minimum RX level to a mobile device, where the first minimum RX level can correspond to a first standard of qualified communications between the mobile device and the base station while utilizing carrier aggregation for communication there between, and the second minimum RX level can correspond to a second standard of qualified communications between the mobile device and the base station when not utilizing carrier aggregation for communication there between. When within a transmission range of the base station, the mobile device can be configured to receive the first and second minimum RX levels and selectively employ the first minimum RX level to communicate with the base station within a qualified coverage area of the base station.

BRIEF DESCRIPTION OF THE DRAWINGS

Illustrative embodiments of the present disclosure are described in detail below with reference to the attached drawing figures, and wherein.

DETAILED DESCRIPTION

The subject matter of select embodiments of the present disclosure is described with specificity herein to meet statutory requirements. However, the description itself is not intended to define what we regard as our invention, which is what the claims do. The claimed subject matter might be embodied in other ways to include different steps or combinations of steps similar to the ones described in this document, in conjunction with other present or future technologies. Moreover, although the term "step" might be used herein to connote different elements of the methods employed, this term should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present disclosure. The following is a list of these acronyms:

BS Base Station
CDMA Code Division Multiple Access
eNodeB Evolved Node B
GPRS General Packet Radio Service
GSM Global System for Mobile Communications
LTE Long-Term Evolution
QPSK Quadrature phase-shift keying
RF Radio-Frequency
SIB System Information Block Further, various technical terms are used throughout this description. An illustrative resource that fleshes out various aspects of these terms can be found in Newton's Telecom Dictionary, 27th Edition (2012).

Embodiments of our technology may be embodied as, among other things, a method, system, or computer-program product. Accordingly, the embodiments may take the form of a hardware embodiment, or an embodiment combining software and hardware. In one embodiment, the present disclosure takes the form of a computer-program product that includes computer-useable instructions embodied on one or more computer-readable media.

Computer-readable media include both volatile and non-volatile media, removable and non-removable media, and contemplate media readable by a database, a switch, and various other network devices. Computer-readable media include media implemented in any way for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

For most wireless telecommunication systems, wireless communications involving base stations and mobile devices are held to a strict communications standard. By way of a non-limiting example, LTE (short for Long Term Evolution) can be a wireless data communications technology that has a strict communications protocol that is defined by the 3GPP standard. Such standards require strict processes between base stations and user equipment (e.g., mobile devices) to enable communications there between, the processes including, but not limited to negotiations, hand-offs, voice communications, data communications, and the like. One of these processes can be the exchange of access parameters (also known as cell selection criterion) transmitted from a base station to a mobile device that is within a transmission range of the base station. In more detail, each access parameter must be in compliance with a universal standard (e.g., the 3GPP standard) so that user equipment, such as a mobile device, can eventually communicate with the base station so long as both the user equipment and the base station are configured in accordance with the standard. These access parameters define, in part, conditions that must be met before communications between the mobile device and the base station are enabled.

In reference to the present disclosure, one particular access parameter can include a minimum required received transmission level in the cell. In other words, the parameter defines a condition—a minimum received transmission level—that a user equipment must have with the base station to enable communications therewith. As noted above, the communication standard may strictly define each parameter variable. In a non-limiting example, the 3GPP standard specifically labels the minimum received transmission level parameter as "q-RxLevMin." In this regard, every user equipment utilizing a communications standard, such as LTE, should be able to parse the access parameters from received base station radio transmissions using known parameter variables defined by the standard.

Continuing with this example, the communication standard requires that each cell tower transmit a q-RxLevMin access parameter so as to facilitate communications with the user equipment. Aspects described herein offer improved systems and methods so as to facilitate communications between a cell tower and a mobile device based on a non-standardized (e.g., proprietary) access parameter. For instance, while a base station can transmit the standard q-RxLevMin, the base station described herein may additionally transmit the non-standardized access parameter (e.g., "q-RxLevMin_CA") to establish qualified communications while utilizing carrier aggregation. Accordingly, the base station can establish a communications link with a mobile device based on its capabilities (e.g., an ability to utilize carrier aggregation). In some aspects, the mobile device can recognize one or both of these access parameters, but may selectively employ only the standardized parameter or the non-standardized parameter.

As mentioned, embodiments of the present disclosure are directed toward methods and systems for facilitating a dynamic selection of minimum receiver (RX) levels based in part on the availability of carrier aggregation for communication between a base station and a mobile device. For instance, instead of utilizing default minimum RX levels for all mobile devices, embodiments provide for a base station that facilitates a mobile device's dynamic selection of a minimum RX level based on the mobile device and base station's ability to utilize carrier aggregation for communications there between. Because the minimum RX level of the present disclosure impacts the qualified coverage area and capacity of the base station, as discussed below, the base station can utilize different minimum RX levels to offer qualified coverage areas and/or conserve the base station's capacity. In particular, the base station can utilize different minimum RX levels based on a mobile device's capability of utilizing carrier aggregation for communication.

In one embodiment, this can be accomplished by transmitting a first and a second minimum RX level to the mobile device, where the first minimum RX level may be associated with the system's utilization of carrier aggregation, and the second minimum RX level may be associated with the system's inability to utilize carrier aggregation or, in other words, the system's limited ability of utilizing a single carrier for communication. The mobile device can be configured to receive, from a base station capable of utilizing both a single carrier and carrier aggregation for communication, the first and second minimum RX levels. In response to receiving the first and second minimum RX levels, the mobile device can selectively employ an appropriate minimum RX level based in part on whether the mobile device is configured for (e.g., capable of utilizing) carrier aggregation for communication with the base station. More specifically, if the mobile device can identify the non-standardized first minimum RX level, in addition to the standardized second minimum RX level, the mobile device can selectively employ the non-standardized first minimum RX level to utilize carrier aggregation for communication with the base station. In the alternative, if the mobile device cannot identify the non-standardized first minimum RX level, it is likely that the mobile device does not support carrier aggregation communications, and the standardized second minimum RX level will be employed for single carrier communications.

It should be appreciated that the minimum RX levels may impact the base station's coverage area and capacity. For example, by decreasing or otherwise relaxing the minimum RX levels, the qualified coverage area may be expanded while the base station's capacity may be drained. This is because, by expanding the qualified coverage area, the base station allows the user equipment to establish a communications link despite experiencing a low signal strength. While this expands the coverage area, it drains the capacity of the base station because it requires the base station communicate with the mobile device using the most robust modulation techniques (e.g., a QPSK with the highest order of coding), thereby decreasing the base station's resources (i.e., available bandwidth).

The minimum RX level may be associated with a standard of qualified communications. In aspects, the minimum RX level may correspond to a minimum quality threshold that must be met before the mobile device and the base station can establish a communications link. Because the signal strength of the mobile device must meet the minimum RX level in order to establish a communications link with appropriate quality (e.g., bandwidth, stable connectivity), the base station and the mobile device will enjoy the standard of qualified communications that corresponds to the minimum RX level once the communications link is established. In addition, because aspects of the base station and mobile device can utilize a first and a second minimum RX level, the base station can enjoy a first and/or a second standard of qualified communications depending on the capabilities of the mobile device.

In a first aspect of the present disclosure, a base station transmits, to a mobile device located within a transmission range (hereinafter referred to as a "cell") of the base station, a set of access parameters that enables the mobile device to communicate with the base station. The set of access parameters may comprise a first minimum RX level that corresponds to a first standard of qualified communications between the mobile device and the base station utilizing carrier aggregation for communication, and a second minimum RX level that corresponds to a second standard of qualified communications between the mobile device and the base station without utilizing carrier aggregation (e.g., utilizing a single carrier) for communication. The mobile device can be configured to receive the set of access parameters and selectively employ the first minimum RX level to communicate with the base station within the qualified coverage area in accordance with the first standard of qualified communications.

In a second aspect of the present disclosure, a method for determining a qualified coverage area of a cell is provided. The method includes determining a set of access parameters for a base station. The method further includes transmitting, from the base station, a set of access parameters to a mobile device that is located within the cell of the base station. In embodiments, the mobile device can be capable of utilizing carrier aggregation to communicate with the base station. The set of access parameters may comprise a first minimum RX level that corresponds to a first standard of qualified communications between the mobile device and the base station utilizing carrier aggregation, and a second minimum RX level that corresponds to a second standard of qualified communications between the mobile device and the base station without utilizing carrier aggregation. Additionally, the method includes communicating with the mobile device based on the first minimum RX level.

In a third aspect of the present disclosure, the present disclosure is a system for defining a qualified coverage area for a cell. The system comprises a base station that transmits, to a mobile device located within the cell of the base station, a set of access parameters that can enable the mobile device to communicate with the base station. The set of access parameters comprises a first minimum (RX) level that corresponds to a first standard of qualified communications between the mobile device and the base station. In addition, the mobile device can be configured to determine a second minimum RX level that corresponds to a second standard of qualified communications between the mobile device and the base station. Further, the mobile device can select the second minimum RX level based at least in part on its capability to communicate with the base station utilizing the second minimum RX level.

Figure 1:
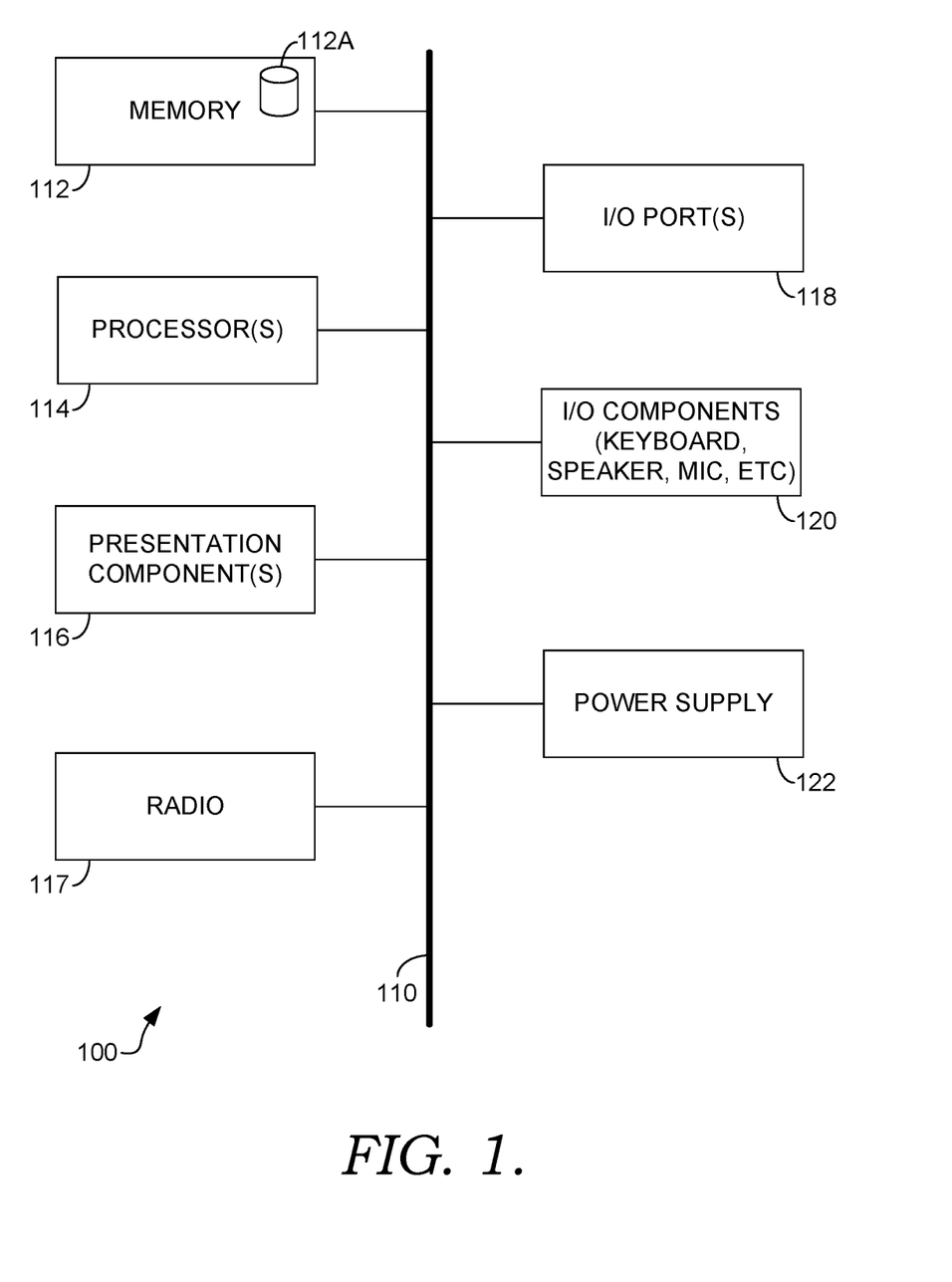
FIG. 1 depicts a block diagram of a mobile device in accordance with an embodiment of the present disclosure.

Turning now to FIG. 1, a block diagram of an illustrative communications device according to one embodiment is provided and referenced generally by the numeral 100. Although some components are shown in the singular, they may be plural. For example, communications device 100 might include multiple processors or multiple radios, etc. As illustratively shown, communications device 100 includes a bus 110 that directly or indirectly couples various components together including memory 112, a processor 114, a presentation component 116, a radio 117, input/output ports 118, input/output components 120, and a power supply 122.

Memory 112 might take the form of memory components previously described. Thus, further elaboration will not be provided here, only to say that memory component 112 can include any type of medium that is capable of storing information (e.g., a database). A database can be any collection of records. In one embodiment, memory 112 includes a set of embodied computer-executable instructions 112A that, when executed, facilitate various aspects disclosed herein. These embodied instructions will variously be referred to as "instructions" or an "application" for short.

Processor 114 might actually be multiple processors that receive instructions and process them accordingly. Presentation component 116 includes the likes of a display, a speaker, as well as other components that can present information (such as a lamp (LED), or even lighted keyboards).

Numeral 117 represents a radio(s) that facilitates communication with a wireless-telecommunications network. Illustrative wireless telecommunications technologies include CDMA, GPRS, TDMA, GSM, WiMax, LTE, and the like. In some embodiments, radio 117 might also facilitate other types of wireless communications including Wi-Fi communications and GIS communications. As can be appreciated, in various embodiments, radio 117 can be configured to support multiple technologies, and/or multiple radios can be utilized to support a technology or multiple technologies.

Input/output port 118 might take on a variety of forms. Illustrative input/output ports include a USB jack, stereo jack, infrared port, proprietary communications ports, and the like. Input/output components 120 include items such as keyboards, microphones, speakers, touch screens, and any other item usable to directly or indirectly input data into communications device 100. Power supply 122 includes items such as batteries, fuel cells, or any other component that can act as a power source to power the communications device 100.

Figure 2A:
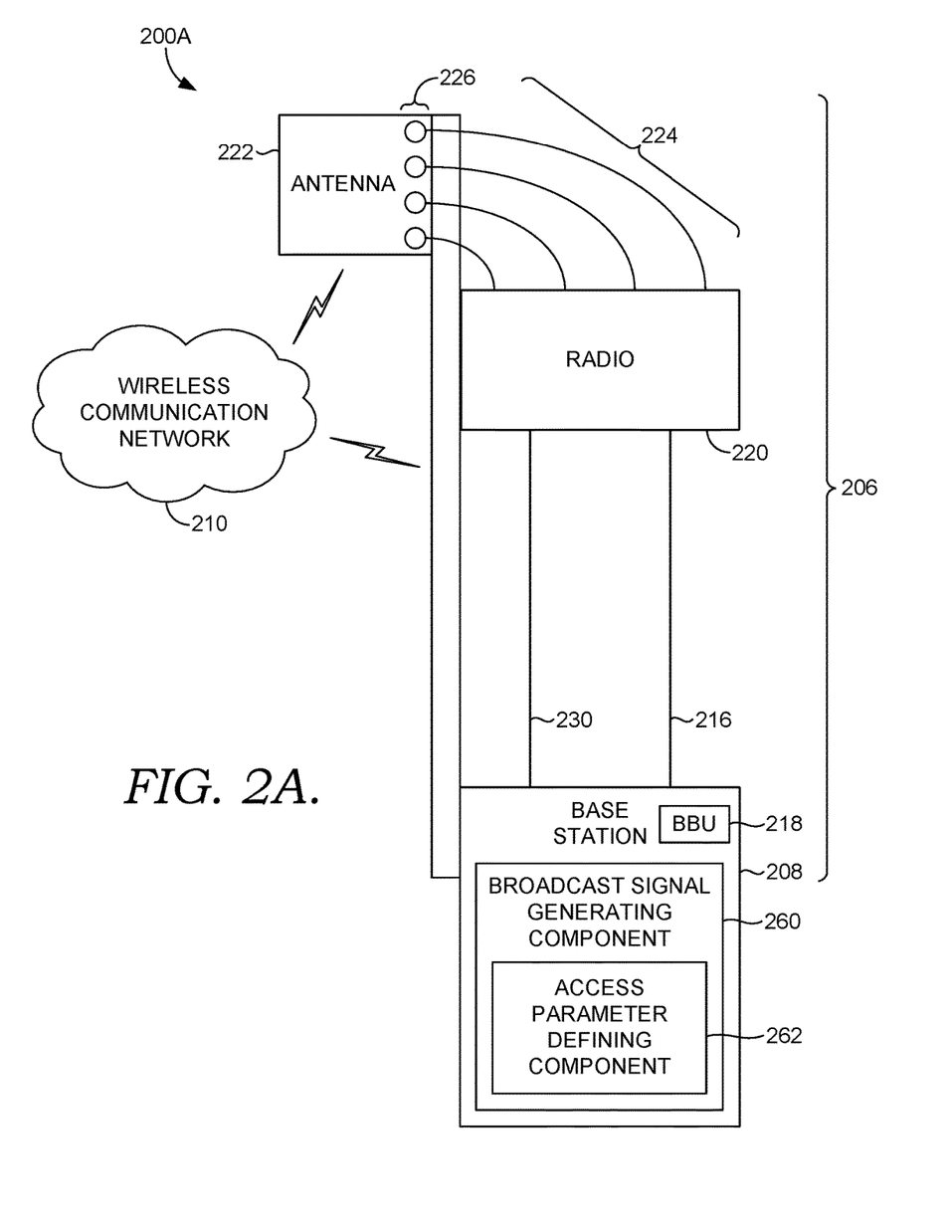
FIG. 2A depicts an illustrative operating environment for carrying out an embodiment of the present disclosure.

Turning now to FIG. 2A, a wireless communication system 200A in accordance with one embodiment of the present invention is illustrated, which includes a wireless communication network 210 and a radio tower 206. The radio tower 206 can be a tall structure designed to support an antenna(s) (e.g., antenna 222) for telecommunications and/or broadcasting. The radio tower 206 is not intended herein to be limited to any shape and/or structure. As a non-limiting example, the radio tower 206 can be a building or pole on which a transmitting antenna is installed. As another example, a mobile radio tower can be employed.

As illustrated in FIG. 2A, the radio tower 206 includes or can be associated with a base station 208, a radio 220, and an antenna 222. Although described in the present disclosure as separate components, it is understood that in some aspects, the radio tower 206, radio 220, and antenna 222, in addition to any combination of the described components coupled thereto, can be referred to as a "base station." It is further understood that the described components are not to be limiting in any way, and that additional components not described herein can be employed to facilitate a wireless communications network as described. In one embodiment, base station 208 can be a wireless communications station that can be installed at a fixed location, such as near the base of the radio tower 206. In another embodiment, base station 208 can be a mobile base station. The base station 208 may be an eNodeB in an LTE (or other standardized) telecommunications network and is typically employed by a telecommunications service provider in the wireless communications network 210. For example, base station 208 can facilitate wireless communication between a communications device (e.g., a UE or mobile device 202) and a network(s), while the base station 208 is typically hardwired to a wireless communications network backbone (not shown), though in some instances wireless communications to the backbone can be facilitated.

A communications device includes a user equipment or device that can utilize the wireless communications network by exchanging communications with the base station 208. A communications device may take on a variety of forms, such as a personal computer (PC), a laptop computer, a tablet, a mobile phone, a personal digital assistant (PDA), a server, or any other device that is capable of communicating with other devices through a wireless telecommunications network. In one embodiment, a communications device can be the communications device described in relation to FIG. 1. Such a network might be a single network or multiple networks, as well as being a network of networks. A network(s) might comprise, for example, a cable network, an Intranet, the Internet, a wireless network (e.g., a wireless telecommunications network), or a combination thereof or portions thereof.

The base station 208 can include at least one baseband unit (BBU) 218. In general, the BBU 218 can be responsible for, among other things, digital baseband signal processing. For instance, CDMA/EVDO and LTE Internet protocol (IP) packets are received from a wireless communications network and are digitally combined by the BBU 218. The blended digital baseband signal can then be transmitted to the radio 220. Digital baseband signals received from the radio 220 are demodulated by the BBU 218 and the resulting IP packets are then transmitted by the BBU 218 to the core network.

The radio 220 may include at least one transceiver configured to receive and transmit signals or data. For example, the radio 220 can transmit and receive wireless RF signals. The radio 220 converts the blended digital signal received from the BBU 218 into an analog RF output via a digital-to-analog (AD) converter. The analog signal is then amplified by an amplifier in the radio 220 and sent out for transmission to a communications device via the antenna port 226 of the antenna 222. The RF signals received from the communications device via the antenna ports 226 are amplified by the radio 220 and converted to digital baseband signals for transmission to the BBU 218.

The radio tower 206 of FIG. 2A can include a radio 220 that is positioned remote from the base station 212. The base station 212 can be connected to the radio 220 via one or more data transmission paths 230 and 216, such as one or more fiber optic cables. In alternative embodiments not depicted in FIG. 2A, the radio 220 can be integrated within the base station 208.

The radio 220 generally communicates with the antenna 222. In this regard, the radio 220 can be used to transmit signals or data to the antenna 222 and receive signals or data from the antenna 222. Communications between the radio 220 and the antenna 222 can occur using any number of physical paths, e.g., physical paths 224. A physical path 224, as used herein, refers to a path used for transmitting signals or data. As such, a physical path 224 may be referred to as a radio frequency (RF) path, a coaxial cable path, cable path, or the like.

The antenna 222 can be used for telecommunications. Generally, an antenna can be an electrical device that converts electric power into radio waves and converts radio waves into electric power. The antenna 222 is typically positioned at or near the top of the radio tower 206. Such an installation location, however, is not intended to limit the scope of embodiments of the present invention.

The base station 208 may comprise a broadcast signal generating component 260 and an access parameter defining component 262. As discussed in more detail below, the access parameters are broadcasted to a mobile device 202 so as to establish a communications link 204 (shown in FIG. 2C). The broadcast signal generating component 260 can be configured to generate signals comprising access parameters (e.g., illustrative message 310 comprising access parameters 320), which can be generated by and provided from an access parameter defining component 262. The broadcast signal generating component 260 receives the one or more access parameters and formats the access parameters in a message (e.g., a System Information Block) so as to be broadcasted by the base station 208. It should be appreciated that the broadcast signal generating component 260 can be provided in a separate component, or included as a subcomponent or feature (i.e., executable code) of the baseband unit 218. Further, while the illustrated embodiment shows the broadcast signal generating component 260 as a component of the base station 208, it is also contemplated that the broadcast signal generating component 260 can also be a subcomponent or feature of the radio 220.

The access parameter defining component 262 can generate and/or provide the access parameters (e.g., access parameters 320) to the broadcast signal generating component 260. It should be appreciated that the access parameter defining component 262 may be a subcomponent or independent component of the broadcast signal generating component 260. The access parameter defining component 262 can be configured to determine and/or store the access parameters in a computer-readable media of the base station 208. In some embodiments, the access parameter defining component can generate and/or provide a standardized and a non-standardized q-RxLevMin to the broadcast signal generating component 260.

Figure 2B:
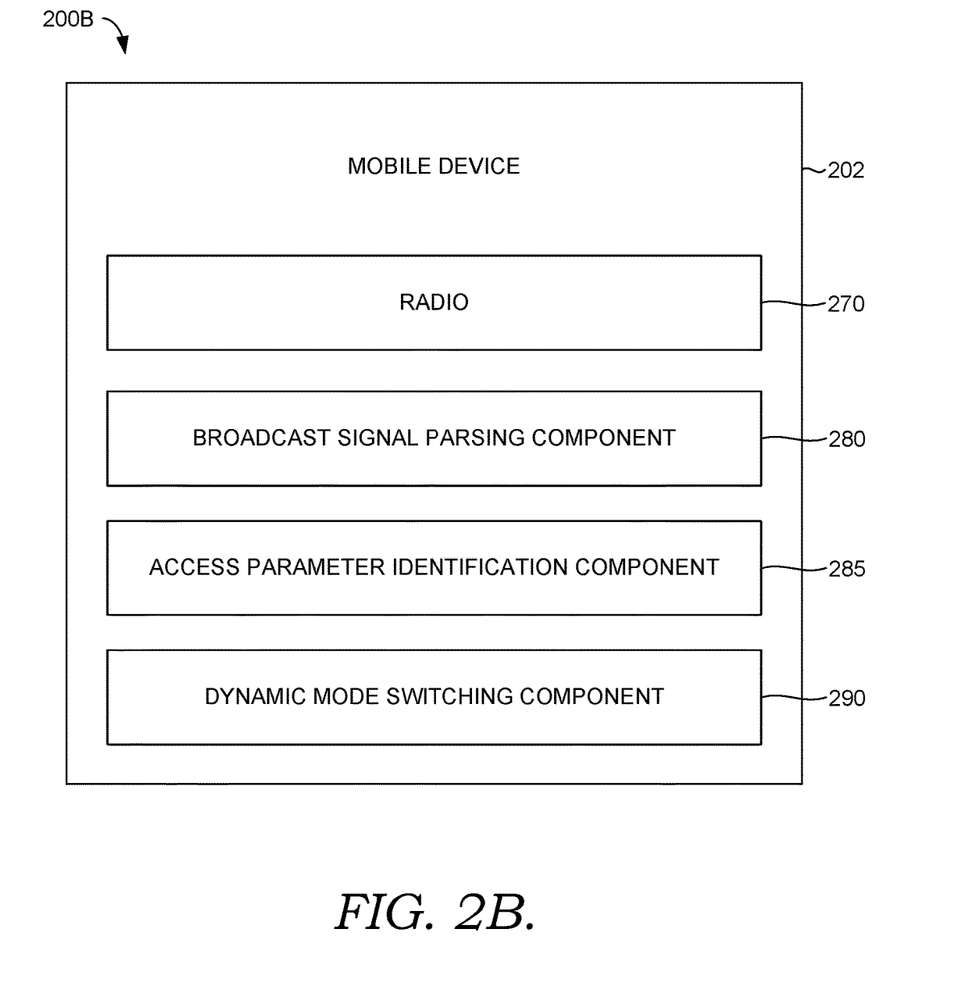
FIG. 2B depicts an illustrative operating environment for carrying out an embodiment of the present disclosure.

Referring now to FIG. 2B, a user equipment system 200B for receiving and parsing a message containing access parameters is illustrated in accordance with some embodiments of the present invention. A mobile device 202 (e.g., the communications device 100 of FIG. 1) can comprise a broadcast signal parsing component 280 and a radio 270. As described in more detail below, the mobile device 202 can receive a broadcasted message containing the access parameters for the base station 208 through the radio 270 of the mobile device 202 (similar to radio 117 of communications device 100 in FIG. 1). The broadcasted message can be parsed by the broadcast signal parsing component 280 to determine the access parameters for enabling communications between the mobile device 202 and the base station 208. In one aspect, the broadcast signal parsing component 280 can be capable of parsing one or more messages containing the standardized access parameter (e.g., a standard minimum receiver level) and/or the non-standardized access parameter (e.g., a proprietary minimum receiver level).

An access parameter identification component 285 can analyze the parsed broadcasted message, identify recognized access parameters, and employ the recognized access parameters to establish a communications link 204 to the base station 208. For instance, the access parameter identification component 285 can be configured to identify one or more minimum receiver levels that have been parsed by the broadcast signal parsing component 280. In an exemplary aspect, the access parameter identification component 285 can identify a standardized minimum receiver level (e.g. first minimum receiver level 330 of FIG. 3) and/or a non-standardized minimum receiver level (e.g., second minimum receiver level 340 of FIG. 3).

As conventional mobile devices are configured to only employ a standardized minimum receiver level, any unknown access parameters that are identified by access parameter identification component 285 are typically disposed of, and serve no beneficial purpose to improve or dynamically change communication methods between the mobile device 202 and the base station 208. The identified one or more minimum receiver levels can be provided to the dynamic mode switching component 290. The dynamic mode switching component 290 can utilize the identified one or more minimum receiver levels and instruct the mobile device 202 to establish the communications link 204 with the base station 208 accordingly. In an exemplary aspect, if both a standardized and non-standardized minimum receiver level is identified, the dynamic mode switching component 290 can instruct the mobile device 202 to establish the communications link 204 utilizing the non-standardized minimum receiver level, which allows the base station 208 to establish a communications link 204 with the mobile device 202 utilizing carrier aggregation (discussed in greater detail below). In yet another aspect, the dynamic mode switching component 290 can instruct the mobile device 202 to establish the communications link 204 utilizing the standardized minimum receiver level, which allows the base station 208 to establish a communications link 204 with the mobile device 202 without utilizing carrier aggregation. It should be appreciated that while the illustrated embodiment shows the broadcast signal parsing component 280, the access parameter identification component 285, and the dynamic mode switching component 290 as separate components, it is contemplated that these components may be a subcomponent of one another.

Figure 2C:
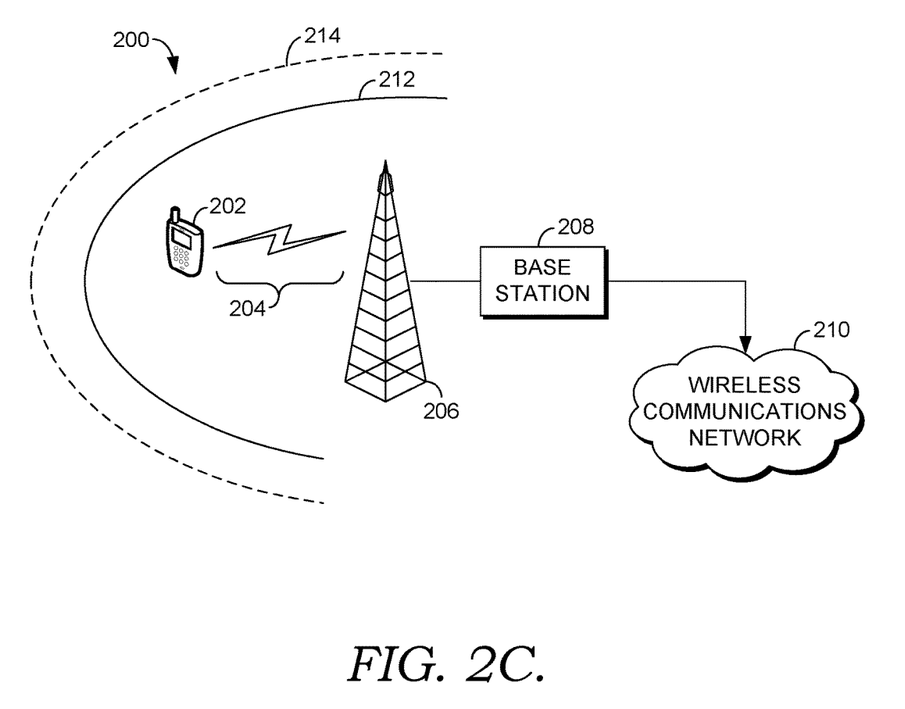
FIG. 2C depicts an illustrative operating environment for carrying out an embodiment of the present disclosure.

Turning now to FIG. 2C, the radio tower 206 can include or can be associated with the base station 208. In embodiments, the base station 208 can be a wireless communications station that is installed at a fixed location, such as near the base of the radio tower 206. In other embodiments, the base station 208 can be a mobile base station. The base station 208 may be an eNodeB in an LTE telecommunications network and can be used to communicate as part of the wireless communications network 210. For example, the base station 208 can facilitate wireless communications between a communications device (i.e., a mobile device 202) and a network(s) 210. The mobile device 202 can subscribe to services offered by the wireless communications network 210. As such, the mobile device 202 may be in communication with the base station 208 via wireless-telecommunications links such as, for example, wireless-telecommunications link 204, which allows for data to be wirelessly communicated between the mobile device 202 and the cell tower 206. The mobile device 202 can communicate with the base station 208 via the wireless communications network 210 to facilitate an "attachment" of the mobile device 202 to the base station 208. As referred to herein, an "attachment" of mobile device 202 and base station 208 describes an establishing of a wireless-telecommunications link 204 between mobile device 202 and the base station 208, to send and/or receive voice call information and/or data information as well as information concerning device capabilities. In one aspect, the mobile device 202 can utilize the wireless communications network 210 to send and/or receive data session requests to the base station 208.

The base station 208 includes hardware and bandwidth(s) of a specified frequency. Although the term "base station" is used throughout this application, equivalent terms may include radio access node, eNodeB, and Node B. For example, if the wireless communications system utilizes LTE, the base station would be termed eNodeB. The hardware includes, for example, the actual radio mast or tower (shown separately as item 206), as well as antennas, transceivers, GPS receivers, electrical power sources, digital signal processors, control electronics, and the like that are associated with the radio tower. The RF spectrum bandwidth may comprise one or more channels. With respect to this application, the term "channel" refers to an upload spectrum and/or a download spectrum.

In some embodiments, the base station 208 can be configured to operate according to a frequency division duplex (FDD) configuration or a time division duplex (TDD) configuration. In an FDD configuration, separate frequencies are used for downlink and uplink communication so that downlink and uplink communication can occur simultaneously. In a TDD configuration, on the other hand, the same frequency can be used for both downlink and uplink communication, and downlink and uplink communications are separated from each other by alternating use of the frequency over time. For simplicity, the present disclosure will focus on the FDD configuration, but it will be understood that the principles discussed can apply in a TDD configuration as well.

In some embodiments, cellular service providers may be limited to one or more bands. As such, the service providers may have a limited bandwidth with regard to each band. For instance, a cellular service provider may be limited to a first band at 1900 MHz and a second band at 800 MHz, where each band comprises two separate 5×5 MHz channels. Hence, the service provider may have limited available bandwidth resources, which could impact the access parameters and qualified coverage area of a base station.

In some embodiments, the base station can be capable of supporting carrier aggregation methods of communication to allow for wider transmission bandwidths. In carrier aggregation, the upload and download resources of the mobile device 202 may be allocated via the aggregated resource of two or more component carriers. The two or more component carriers may be associated with varying bands and may comprise bandwidths 1.4, 3, 5, 10, 15, and/or 20 MHz. Carrier aggregation may be achieved using non-contiguous and/or contiguous component carriers. For instance, in one aspect, the base station 208 and the mobile device 202 can communicate via carrier aggregation using contiguous component carriers that are within the same operating frequency band (e.g., "intra-band contiguous"). In another aspect, the base station 208 and the mobile device 202 can communicate via carrier aggregation using non-contiguous bands, either intra-band or inter-band. With respect to intra-band, non-contiguous carrier aggregation, the component carriers may belong to the same operating frequency band but have one or more gaps in between the component carriers. With respect to inter-band, non-contiguous carrier aggregation, the component carriers may belong to different operating frequency bands. In exemplary aspects, the base station 208 and the mobile device 202 may communicate over the communications network 210 utilizing the aggregation of two component carriers of 5×5 MHz bands to increase the available bandwidth to 10×10 MHz. In other aspects, the system can aggregate the component carriers of a 5×5 MHz band and a 10×10 MHz band. Further, any number of component carriers can be used during carrier aggregation. As such, in one embodiment, carrier aggregation can be utilized to effectively treat the two 5×5 MHz bands as one 10×10 MHz band.

As mentioned above, in some embodiments, the cellular service provider may be limited to a first band at 1900 MHz and a second band at 800 MHz, both of which may be associated with 5×5 MHz bands. Hence, embodiments of the base station 208 can utilize carrier aggregation to carrier aggregate the first band at 1900 MHz and the second band at 800 MHz. By employing carrier aggregation, the base station 208 could effectively treat these two 5×5 MHz bands as one 10×10 MHz band, thereby increasing the base station's bandwidth and overall capacity.

Generally, while the base station 208 may be capable of carrier aggregation, the mobile device 202 may or may not be capable of utilizing carrier aggregation. Based on how the mobile device 202 is configured, it can be capable of communicating with the base station 208 via carrier aggregation. For instance, in some embodiments, where the mobile device 202 is not configured to employ carrier aggregation, the communications link 204 between the mobile device 202 and the base station 208 must be established using single carrier methods of communication. That is, the mobile device 202 and the base station 208 would communicate over the wireless communications network 210 using non-carrier aggregation methods of communication. Hence, if the mobile device 202 was not configured for carrier aggregation, the communications link 204 with the base station 208 can be based on only one of the 5×5 MHz bands. In contrast, if the mobile device 202 was configured for carrier aggregation, the communications link 204 with the base station 208 can be based on aggregating the two component carriers, effectively treating the two 5×5 MHz bands as one 10×10 MHz band.

In some aspects, the base station 208 can responsible for communicating, via radio transmissions, access parameters that can be utilized by the mobile device 202 in order to communicate via the communications link 204 with the base station 208 associated with a standard of qualified communications. While discussed in greater detail below, in an embodiment, the access parameters can be transmitted from the base station 208 to the mobile device 202 through a Long Term Evolution (LTE) System Information Block (SIB). As the access parameters are transmitted, the mobile device 202 can be configured to receive the access parameters and employ the appropriate access parameters based on the ability of the mobile device 202 to utilize the method of communication exchange (e.g., carrier aggregation).

In embodiments, the access parameters may comprise the minimum RX level so as to establish a standard of qualified communications with the base station 208. The minimum RX level may refer to a transmission signal strength that must be received, from the base station 208 by the mobile device 202, so as to establish an attachment with the base station 208. The minimum RX level can be described in a variety of formats, such as a reference signal received power (RSRP), a received signal strength indicator (RSSI), a signal to interference-plus-noise ratio (SINR), and/or a carrier to interference-plus-noise ratio (CINR). The mobile device 202 can be configured to continuously monitor the received transmission signal strength from the base station 208. Once the monitored signal strength is within range of the minimum RX level required by the base station 208, the access parameter may be satisfied, and the mobile device 202 can be configured to establish and/or maintain a communications link 204 with the base station 208. While universal standards require a base station transmit access parameters, such as a minimum RX level, these universal standards are not device specific and may not necessarily account for the capabilities of the mobile device 202. Accordingly, in one aspect, in addition to transmitting a minimum RX level according to universal standards, the base station 208 can transmit an additional (and/or optional) proprietary access parameter that can be associated with the capabilities of one or more mobile device(s) 202 (e.g., their ability to utilize carrier aggregation). That is, the base station 208 can transmit a first minimum RX level not required by universal standards (e.g., non-standardized) and a second minimum RX level required by the universal standards (e.g., standardized).

In exemplary aspects, the minimum RX level may impact the overall capacity of the base station 208 and the qualified coverage area it provides. For instance, employing a lower, more relaxed minimum RX level can provide an expanded qualified coverage area 214 but may drain the overall capacity (e.g., bandwidth) of the base station 208. In contrast, the base station 208 can employ a higher minimum RX level so as to conserve overall capacity of the base station 208 but result in a restricted qualified coverage area 212. In an exemplary aspect, the minimum RX level may be represented by a q-RxLevMin value, or other similar value, and may range from −75 dBm to −124 dBm. However, these values are exemplary values only and are not meant to limit the scope of the present disclosure since embodiments may have a greater or lesser value.

As mentioned, the base station 208 communicates the access parameters to the mobile device 202 to initiate a communications link 204. In an exemplary aspect, the base station 208 transmits, via radio transmissions, the access parameters to the mobile device 202. The base station 208 can transmit these access parameters through, for example, one or more SIBs that comprise the first and second minimum RX levels. In this aspect, the first minimum RX value can be associated with establishing (e.g., between base station 208 and mobile device 202) a first standard of qualified communications that utilizes carrier aggregation, while the second minimum RX value can be associated with establishing (e.g., between base station 208 and mobile device 202) a second standard of qualified communications that utilizes non-carrier aggregation methods of communication.

As the base station 208 transmits the access parameters, the mobile device 202 can be configured to receive the transmitted access parameters and establish the communications link 204 in accordance with embodiments of the present disclosure. For instance, the mobile device 202 can be configured to identify the defined minimum RX values and selectively employ either the first or second minimum RX levels based on the mobile device's 202 capabilities. In an exemplary aspect, the mobile device 202 can receive the access parameters and employ the first minimum RX value based on the device's ability to utilize carrier aggregation. In other words, the mobile device 202 operable to utilize carrier aggregation can include an operation that parses the received access parameters, identifies the standardized access parameters, and further identifies non-standardized access parameters (e.g., the first minimum RX level). Continuing with this example, the mobile device 202 would disregard the second minimum RX level and establish the communications link 204 based on the first standard of qualified communications corresponding with the first minimum RX level. In this way, the mobile device 202 can employ the proprietary minimum RX level that is not required by now-existing standards.

In another embodiment, the mobile device 202 can receive the access parameters and employ the second minimum RX level. For example, the mobile device 202 can receive a first and second minimum RX value. If the mobile device 202 is not configured to communicate with the base station 208 through carrier aggregation, then the mobile device 202 can be configured to employ the second minimum RX level and communicate with the base station 208 utilizing single carrier communications. As such, the mobile device 202 can ignore (e.g., not recognize) the first minimum RX level and establish a communications link 204 according to a second standard of qualified communications between the mobile device 202 and the base station 208.

As mentioned, the standard of qualified communications can be associated with a minimum quality threshold of the communications link 204. The mobile device 202 and the base station 208 can enjoy a minimum quality threshold if, for example, the signal strength measured by the mobile device 202 satisfies the minimum RX level required by the base station 208. Hence, the minimum RX level may correspond to the standard of qualified communications. The minimum quality threshold may also correspond with the capacity of the base station 208. That is, if the base station 208 has a greater capacity, e.g., by utilizing carrier aggregation, it can have a first minimum quality threshold in the expanded qualified coverage area 214. If the base station 208 has a lower capacity, it can have a second minimum quality threshold in the restricted qualified coverage area 212. It should be appreciated that the first standard of qualified communications may be associated with a higher or lower minimum quality threshold when compared to the second standard of qualified communications.

Figure 3:
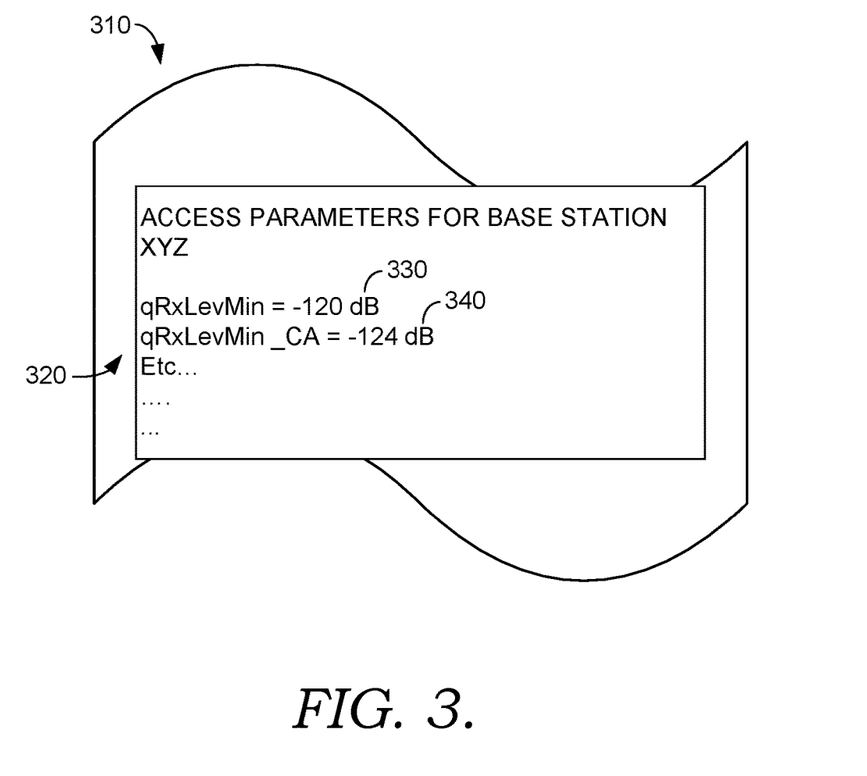
FIG. 3 depicts an exemplary transmission of access parameters that includes at least two minimum receiver levels, in accordance with an embodiment of the present disclosure.

Continuing, the base station 208 can simultaneously offer the first and second qualified communications based on the capabilities of the mobile device 202. For instance, a first mobile device can communicate with base station 208 utilizing carrier aggregation. The base station 208 and the first mobile device can experience a first standard of qualified communications when the measured signal strength satisfies the first minimum RX level 330. The base station 208 can also simultaneously communicate with a second mobile device without utilizing carrier aggregation. The second mobile device and the base station 208 can experience a second standard of qualified communications when the measured signal strength satisfies a second minimum RX level 340. As such, based on the first and second mobile devices capabilities, the base station 208 can concurrently offer and support two or more standards of qualified communications.

FIG. 3 depicts an illustrative message 310 comprising access parameters 320 that are transmitted by the base station 208, in accordance with an embodiment of the present disclosure. The access parameters 320 may comprise one or more minimum RX levels (e.g., 330). In embodiments, the base station 208 can transmit the access parameters 320 to one or more mobile devices 202 in order to set up a communications link 204 that is specific to the mobile device's 202 capabilities. In one instance, the base station 208 transmits the message(s) 310 comprising the access parameters 320 by way of the wireless communications network 210. While FIG. 3 depicts transmitting the access parameters and single message, it should be appreciated that the access parameters 320 may be sent individually over multiple messages.

The mobile device 202 can be configured to receive the transmitted message(s) 310 and determine which access parameters 320 can be used for communicating with the base station 208, as described in greater detail below. In one exemplary embodiment, the access parameters 320 comprise a first minimum RX level 330 of −124 dB and a second minimum RX level 340 of −120 dB. In this example, the first mobile device can be configured to selectively employ the first minimum RX level 330 if it is capable of utilizing carrier aggregation. In a further embodiment, a second mobile device can employ the second minimum RX level 340 if it is not capable of utilizing carrier aggregation. Accordingly, the base station 208 can establish a first communications link with the first mobile device using the first minimum RX level 330 and a second communications link with the second mobile device using the second minimum RX level 340. By transmitting the first and second minimum RX levels 330, 340, the base station 208 can offer a first qualified coverage area for the first mobile device and a second qualified coverage area for the second mobile device.

Figure 4:
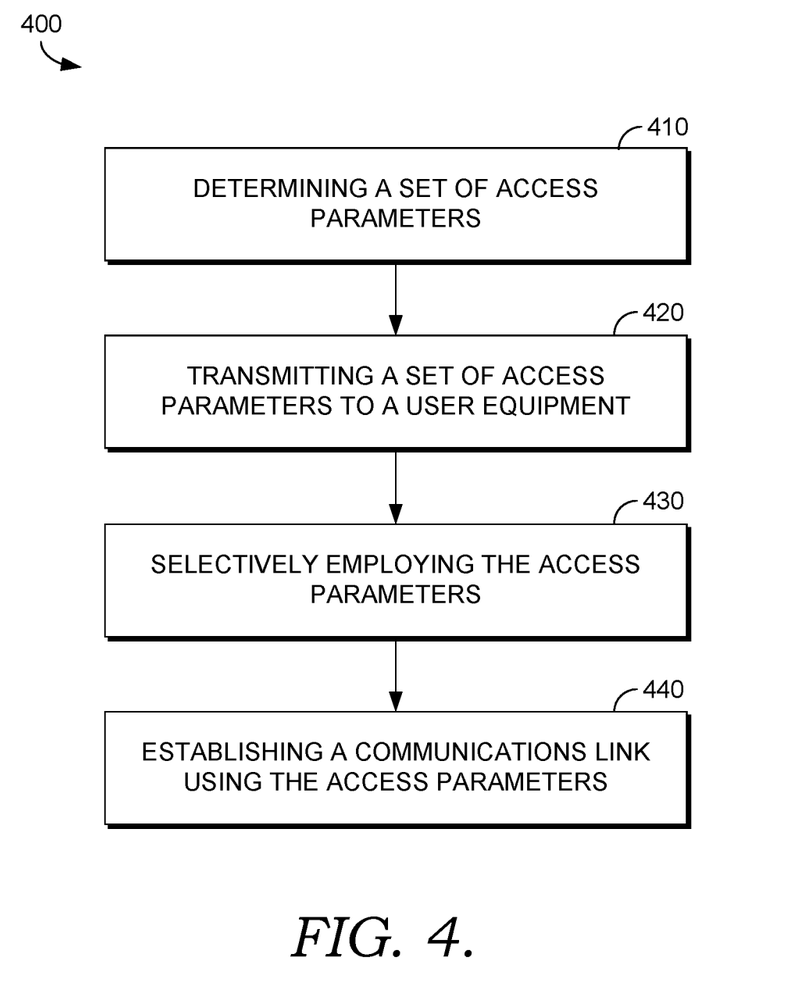
FIG. 4 depicts a flowchart illustrating methods for establishing a communications link by selectively employing access parameters, in accordance with an embodiment of the present disclosure.

Turning now to FIG. 4, a flowchart is depicted illustrating methods for establishing a communications link 204 by selectively employing access parameters, in accordance with an embodiment of the present disclosure. At 410, the set of access parameters can be determined based in part on the availability of the base station 208 and the mobile device 202 to communicate through carrier aggregation. Additionally or alternatively, the set of access parameters can be determined based on a threshold of signal quality that is required to establish the communications link 204 with the base station 208. In exemplary embodiments, the access parameters may comprise the first minimum RX level, which can be determined based in part on the availability of the base station 208 and/or the mobile device 202 to communicate through carrier aggregation on two or more channels. The access parameters may further comprise the second minimum RX level, which can be determined based in part on the base station's 208 and/or the mobile device's 202 inability to carrier aggregate two or more channels. In embodiments, the access parameters can be obtained by a computer associated with the base station 208.

At step 420, the base station 208 can transmit the access parameters to any mobile device 202 determined to be located within the cell of the base station. In an exemplary embodiment, the base station 208 can transmit the access parameters to the mobile device 202 using the message(s) comprising system information. For instance, the access parameters may be contained within one or more SIB messages, such as SIB 1 and/or SIB 3. The one or more SIB messages can be transmitted to the mobile device 202 through a communications network 210. As mentioned, the mobile device 202 can be configured to receive the message(s).

At step 430, the mobile device 202 can be configured to selectively employ the access parameters contained within the SIB. The mobile device 202, for instance, can be configured to determine from the title of the message that it contains access parameters to establish the communications link 204 through the utilization of carrier aggregation. Alternatively or additionally, the mobile device 202 can be configured to determine from the title of the message that it contains access parameters to establish the communications link 204 without utilizing carrier aggregation. In an exemplary embodiment, the message may comprise a unique title name, e.g., "qRxLevMin_FDDCA," that can be associated with the first minimum RX level information for the base station 208 that utilizes carrier aggregation in an FDD configuration. The mobile device 202 can be configured to identify the appropriate title name, retrieve the system information therein, and employ the first minimum RX level based on the device's capability of utilizing carrier aggregation. Continuing with this example, if the mobile device 202 is not capable of utilizing carrier aggregation, it can disregard this file and employ the second minimum RX level that may be contained within the same or another message.

At step 440, the base station 208 can establish the communications link 204 with the mobile device 202 according to the access parameters. In particular, if the mobile device 202 can be configured to selectively employ the first minimum RX level, the base station 208 and the mobile device 202 can communicate according to the first standard of qualified communications. If the mobile device 202 is not configured to utilize the first minimum RX level, it can disregard the first minimum RX level and employ the second minimum RX level. As such, the base station 208 and the mobile device 202 can establish a communications link 204 according to the second standard of qualified communications.

Figure 5:
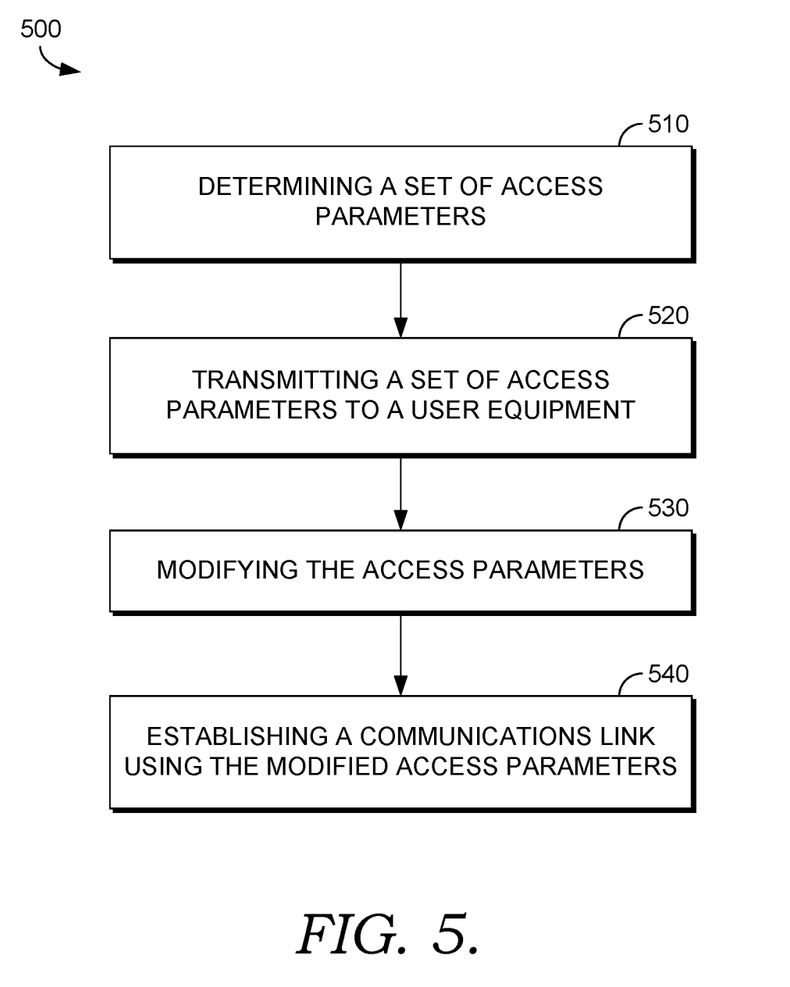
FIG. 5 depicts a flowchart illustrating methods for establishing a communications link based on modified access parameters, in accordance with an embodiment of the present disclosure.

Turning now to FIG. 5, a flowchart is depicted illustrating methods for establishing a communications link 204 based on modified access parameters, in accordance with an embodiment of the present disclosure. At step 410, the base station 208 can determine the access parameters. The access parameters can comprise a default minimum RX level and a minimum RX level modifier. The default minimum RX level can be determined based in part on how the base station 208 and the mobile device 202 communicate without utilizing carrier aggregation. As such, the minimum RX level modifier can be used to modify the default minimum RX level if the base station 208 and the mobile device 202 are capable of communicating through the utilization of carrier aggregation. Additionally or alternatively, if the mobile device 202 is incapable of communicating with the base station 208 through carrier aggregation, it can disregard the minimum RX level modifier and establish a communications link 204 with the base station 208 based on the default minimum RX level.

At step 520, the base station 208 can transmit the access parameters to any mobile device 202 located within the cell of the base station. As mentioned, the base station 208 can transmit the access parameters to the mobile device 202 using a message that comprises system information, such as SIB 1 and/or SIB 3. The SIB can then be transmitted to the mobile device 202, which can be configured to receive the message. In an exemplary aspect, if the mobile device 202 is capable of carrier aggregation, it can identify the minimum RX level modifier within the SIB in order to modify the default minimum RX level.

At step 530, the mobile device 202 can be configured to modify the first access parameters. In an embodiment, the mobile device 202 can be configured to identify the first minimum RX level and the minimum RX level modifier within the message(s) being transmitted by the base station 208. Based on the capability of the mobile device 202 to utilize carrier aggregation, the mobile device can be configured to modify the first minimum RX level using the minimum RX level modifier in order to determine the modified minimum RX level. Accordingly, the mobile device 202 can modify the first access parameters to determine the modified access parameters.

At step 540, the base station 208 can establish a communications link 204 with the mobile device 202 using the modified access parameters. In an exemplary embodiment, the base station 208 can establish the communications link 204 with the mobile device 202 using the modified RX level. In so doing, the base station 208 can communicate with the mobile device 202 according to a modified standard of qualified communications that is associated with the modified access parameters (e.g., modified minimum RX level).

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A system for defining a qualified coverage area of a cell comprising:
a base station that transmits, to a first mobile device and a second mobile device located within the cell of the base station, a set of access parameters that enable the first mobile device and the second mobile device to communicate with the base station,
wherein the set of access parameters comprise a first minimum receiver (RX) level that corresponds to first communications with the base station utilizing carrier aggregation, and a second minimum RX level that corresponds to second communications with the base station utilizing non-carrier aggregation,
wherein the first mobile device is configured to receive the set of access parameters and selectively employ the first minimum RX level to communicate with the base station within the qualified coverage area, and
wherein the second mobile device is configured to receive the set of access parameters and employ the second minimum RX level to communicate with the base station.

2. The system of claim 1, wherein the first and the second minimum RX levels are each associated with a minimum quality threshold.

3. The system of claim 1, wherein employing the first minimum RX level expands the qualified coverage area with respect to the second minimum RX level.

4. The system of claim 1, wherein the first minimum RX level is defined by a proprietary communications standard, and wherein the second minimum RX level is defined by a universal communications standard.

5. The system of claim 1, wherein the base station communicates with the first mobile device based on the first minimum RX level and the second mobile device based on the second minimum RX level.

6. The system of claim 1, wherein the first and the second minimum RX levels are each a q-RxLevmin setting.

7. A method for determining a qualified coverage area of a cell comprising:
obtaining a set of access parameters for a base station;
transmitting, from the base station, the set of access parameters to a first mobile device,
wherein the first mobile device is configured to utilize carrier aggregation to communicate with the base station,
wherein the set of access parameters comprise a first minimum receiver (RX) level that corresponds to first communications between the first mobile device and the base station utilizing carrier aggregation, and a second minimum RX level that corresponds to second communications between the first mobile device and the base station utilizing single carrier communication;
communicating with the first mobile device based on the first minimum RX level;
transmitting the set of access parameters to a second mobile device that is incapable of utilizing carrier aggregation to communicate with the base station; and
communicating with the second mobile device based on the second minimum RX level.

8. The method of claim 7, wherein the first and the second minimum RX levels are each associated with a minimum quality threshold.

9. The method of claim 7, wherein employing the first minimum RX level expands the qualified coverage area with respect to the second minimum RX level.

10. The method of claim 7, wherein the first minimum RX level is defined by a proprietary communications standard, and wherein the second minimum RX level is defined by a universal communications standard.

11. The method of claim 7, wherein the base station simultaneously communicates with the first mobile device based on the first minimum RX level and the second mobile device based on the second minimum RX level.

12. The method of claim 7, wherein the first and the second minimum RX levels are each a q-RxLevmin setting.

13. A system for defining a qualified coverage area for a cell comprising:
    a base station that transmits, to a first mobile device located within the cell of the base station, a set of access parameters that enable the first mobile device to communicate with the base station over a single network,
    wherein the set of access parameters comprise a first minimum receiver (RX) level that corresponds to communications between the first mobile device and the base station over the single network utilizing non-carrier aggregation,
    wherein the first mobile device is configured to determine a modified minimum RX level based on the first device's ability to utilize carrier aggregation, the modified minimum RX level corresponding to communications between the first mobile device and the base station over the single network utilizing carrier aggregation, and
    wherein the first mobile device is configured to communicate with the base station over the single network utilizing the modified minimum RX level.

14. The system of claim 13, wherein the base station transmits the set of access parameters to a second mobile device located within the cell of the base station.

15. The system of claim 14, wherein the second mobile device is configured to communicate with the base station utilizing the first minimum RX level.

16. The system of claim 13, wherein the first and the modified minimum RX levels are each associated with a minimum quality threshold.

17. The system of claim 13, wherein employing the modified minimum RX level expands the qualified coverage area with respect to the first minimum RX level.

18. The system of claim 13, wherein the first and the modified minimum RX levels are a q-RxLevmin setting.

19. The system of claim 13, wherein the first minimum RX level is defined by a universal communications standard, and wherein the modified minimum RX level is defined by a proprietary communications standard.

* * * * *